United States Patent
Homa et al.

(10) Patent No.: US 9,435,944 B2
(45) Date of Patent: Sep. 6, 2016

(54) PHASE MASK PERIOD CONTROL

(75) Inventors: Daniel S. Homa, Blacksburg, VA (US); Brooks A. Childers, Christiansburg, VA (US)

(73) Assignee: BAKER HUGHES INCORPORATED, Houston, TX (US)

(*) Notice: Subject to any disclaimer, the term of this patent is extended or adjusted under 35 U.S.C. 154(b) by 1051 days.

(21) Appl. No.: 13/270,837

(22) Filed: Oct. 11, 2011

(65) Prior Publication Data

US 2013/0087937 A1    Apr. 11, 2013

(51) Int. Cl.
- *G02B 6/00* (2006.01)
- *D01D 5/20* (2006.01)
- *G02B 6/02* (2006.01)

(52) U.S. Cl.
CPC ................... *G02B 6/02138* (2013.01)

(58) Field of Classification Search
CPC .................................................. G02B 6/02138
USPC ............ 264/1.24, 1.27, 1.36–1.38, 1.6, 40.1; 425/76, 174.4, 135
See application file for complete search history.

(56) References Cited

U.S. PATENT DOCUMENTS

| | | | |
|---|---|---|---|
| 5,748,814 A | * | 5/1998 | Painchaud et al. .............. 385/37 |
| 2003/0112516 A1 | * | 6/2003 | Couillard et al. ............. 359/573 |
| 2003/0128929 A1 | | 7/2003 | Unruh |
| 2005/0285059 A1 | * | 12/2005 | Gerber et al. ........... 250/559.45 |
| 2008/0292256 A1 | * | 11/2008 | Homa ............... C03B 37/01807 385/127 |

OTHER PUBLICATIONS

PCT International Preliminary Report on Patentability; International Application No. PCT/US2012/054168; International Filing Date: Sep. 7, 2012; Date of Mailing: Apr. 4, 2014.

* cited by examiner

*Primary Examiner* — Mathieu Vargot
(74) *Attorney, Agent, or Firm* — Cantor Colburn LLP

(57) ABSTRACT

A method, apparatus and system for forming a fiber optic cable is disclosed. A first pattern of a phase mark is formed at a first location in the fiber optic cable. A relational parameter between the fiber optic cable and the phase mask is changed and a second pattern of the phase mask is formed at a second location in the fiber optic cable. The second pattern is related to the first pattern via the change in the relational parameter between the fiber optic cable and the phase mask. A controller can be used to control the relational parameter.

17 Claims, 5 Drawing Sheets

PHASE MASK PERIOD CONTROL

BACKGROUND OF THE DISCLOSURE

1. Field of the Disclosure

The present disclosure is related to methods of producing a fiber optic cable having a plurality of Fiber Bragg Gratings in order to reduce multi-path ringing along the fiber optic cable.

2. Description of the Related Art

In various aspects of oil exploration and production, a fiber optic cable having a plurality of optical sensors formed therein is employed to obtain information from downhole locations. The fiber optic cable typically extends from a surface location to the downhole locations and a light source deployed at the surface propagates light through the fiber optic cable. The propagating light interacts with at least one of the plurality of optical sensors to produce a signal indicative of a downhole parameter. The signal travels through the fiber optic cable to the surface location where it is detected. The signal typically traverses many sensors before reaching the surface location. At each sensor, there is the possibility of a reflection. Therefore, a signal can be reflected multiple times before being detected. These multiple reflections are known as ringing or multi-path interference and generally cause signal loss. The present disclosure therefore provides a method and apparatus for producing a fiber optic cable that reduces ringing in measurements obtained from a fiber optic cable having a plurality of sensors formed therein.

SUMMARY OF THE DISCLOSURE

In one aspect, the present disclosure provides a method of forming a fiber optic cable, including: forming a first pattern of a phase mask at a first location in the fiber optic cable; changing a relational parameter between the fiber optic cable and the phase mask; and forming a second pattern of the phase mask at a second location in the fiber optic cable, wherein the second pattern is related to the first parameter via the relational parameter.

In another aspect, the present disclosure provides an apparatus for forming a fiber optic cable, including a phase mask; a source of electromagnetic radiation configured to propagate light towards the phase mask to transfer a pattern at the phase mask to the fiber optic cable; and a retaining unit configured to change a relational parameter between the phase mask and the fiber optic cable.

In yet another aspect, the present disclosure provides a system for forming a fiber optic cable, including: a phase mask; a source of electromagnetic radiation configured to propagate light towards the phase mask to transfer a pattern at the phase mask to the fiber optic cable; a retaining unit configured to change a relational parameter between the phase mask and the fiber optic cable; and a controller configured to control the retaining unit to change the relational parameter.

Examples of certain features of the apparatus and method disclosed herein are summarized broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, reference should be made to the following detailed description of the exemplary embodiment, taken in conjunction with the accompanying drawings, in which like elements have been given like numerals and wherein.

DETAILED DESCRIPTION OF THE DISCLOSURE

Figure 1:
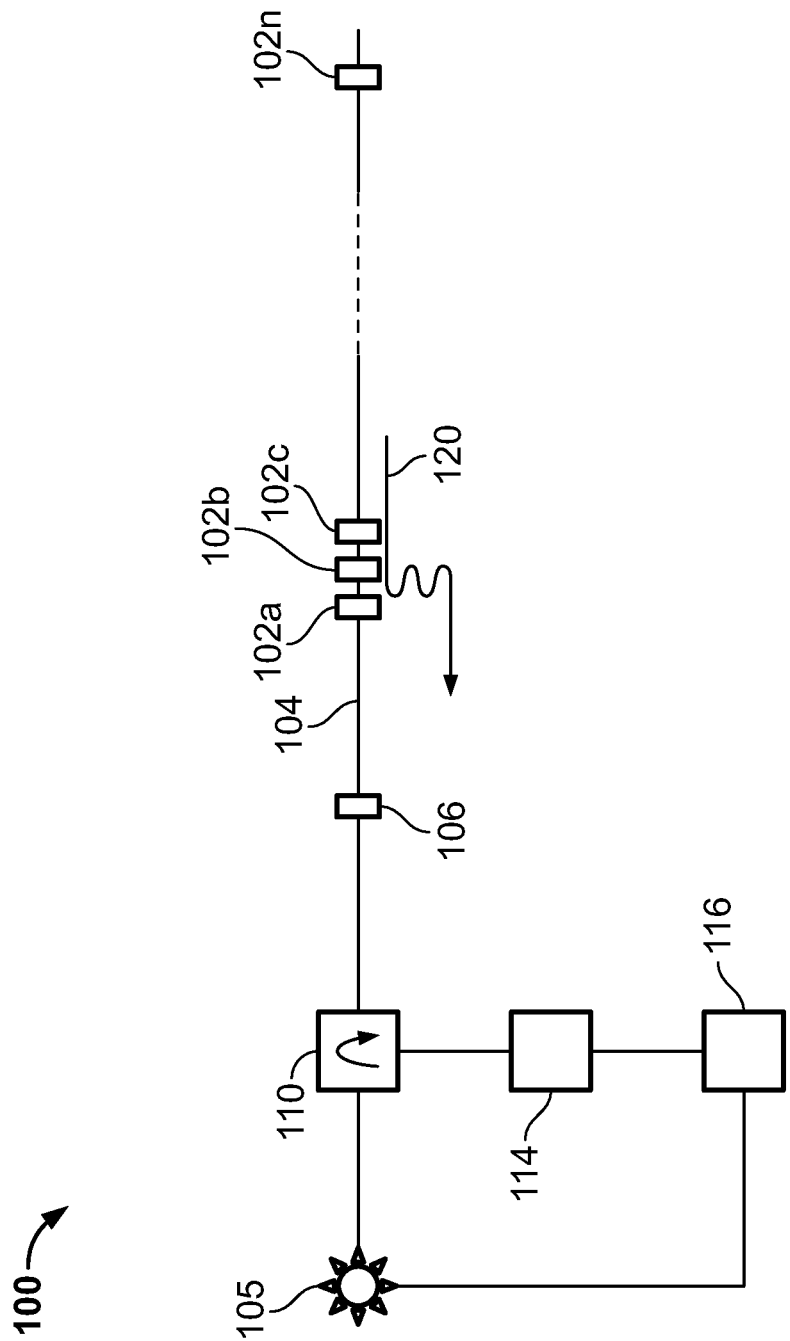
FIG. 1 shows an exemplary optical system for obtaining measurements using an exemplary fiber optic cable formed using the exemplary methods of the present disclosure.

FIG. 1 shows an exemplary optical system 100 for obtaining measurements using an exemplary fiber optic cable formed using the methods of the present disclosure. The system 100 includes a light source 105, a fiber optic cable 104 including a plurality of optical sensors (102$a$, 102$b$, 102$c$, . . . , 102$n$, and referred to collectively as optical sensors 102) formed therein and a detector 214 to detector light signals from the plurality of optical sensors 102. In the exemplary embodiment of FIG. 1, light is transmitted from the light source 105 to a circulator 110. Circulator 110 allows light from light source 105 to propagate through fiber optic cable 104 and provides light returning from the fiber optic cable to detector 114, which can be a photo detector, a charge-coupled device, optical-electrical converter, among others. Signals are produced in the fiber optic cable via interaction of the propagated light with the optical sensors 102. These produced signals are reflected backwards along the fiber optic cable towards the circulator to be received at detector 114. A processor 116 generally receives electrical signals from the detector 114 and also provides a control of the light source. The processor 116 identifies a signal with a particular sensor generally by knowledge of a travel time or optical path length of the signal.

In a typical embodiment, the fiber optic cable 104 is wrapped around the surface of a member or structure and each of the plurality of optical sensors 102 is thereby attached at a particular location to member. A change in a parameter, such as strain or temperature, at the particular location is therefore detected by the sensor attached at or near the particular location, which thus provides a signal corresponding to the detected change in parameter. The fiber optic system can be at a land or sea location, can be used for oil exploration, oil production, measurement-while-drilling, wireline logging, etc. and can be used for example in Real Time Compaction Monitoring (RTCM), Distributed Temperature Sensing (DTS), optical frequency domain reflectometry (OFDR), or any applicable methods using swept-wavelength interferometry, for example.

In an exemplary embodiment, the optical sensors 102 are Fiber-Bragg Gratings (FBGs). An FBG is a periodic change in the refractive index of the core of an optical fiber and between regions of higher and lower refractive index. This periodic change, typically referred to as a grating period, is typically along the axis of the fiber optic cable and is created in the core of the fiber optic cable using a laser etching process, as discussed below with respect to FIG. 2. An FBG reflects a percentage of incoming light, but only at a specific wavelength known as the Bragg wavelength or central wavelength of the FBG, which is related to the grating period. Typically, the optical sensors 102 are equidistantly spaced from each other along the fiber optic cable. An exemplary separation distance is about 10 cm. Due to the plurality of FBGs on fiber optic cable 104, as well as their substantially equidistant spacing, noise known as multi-path interference or 'ringing' occurs in the fiber optic cable. In such ringing, a signal or portion thereof can be reflected back and forth between FBGs of equal central wavelengths, as represented by multiply-reflected optical path 120 in FIG. 1. The multi-path ringing in the fiber optic cable can cause signals to overlap. Fiber optic cable formed using the exemplary methods disclosed herein reduce the occurrence of such ringing.

Figure 2:
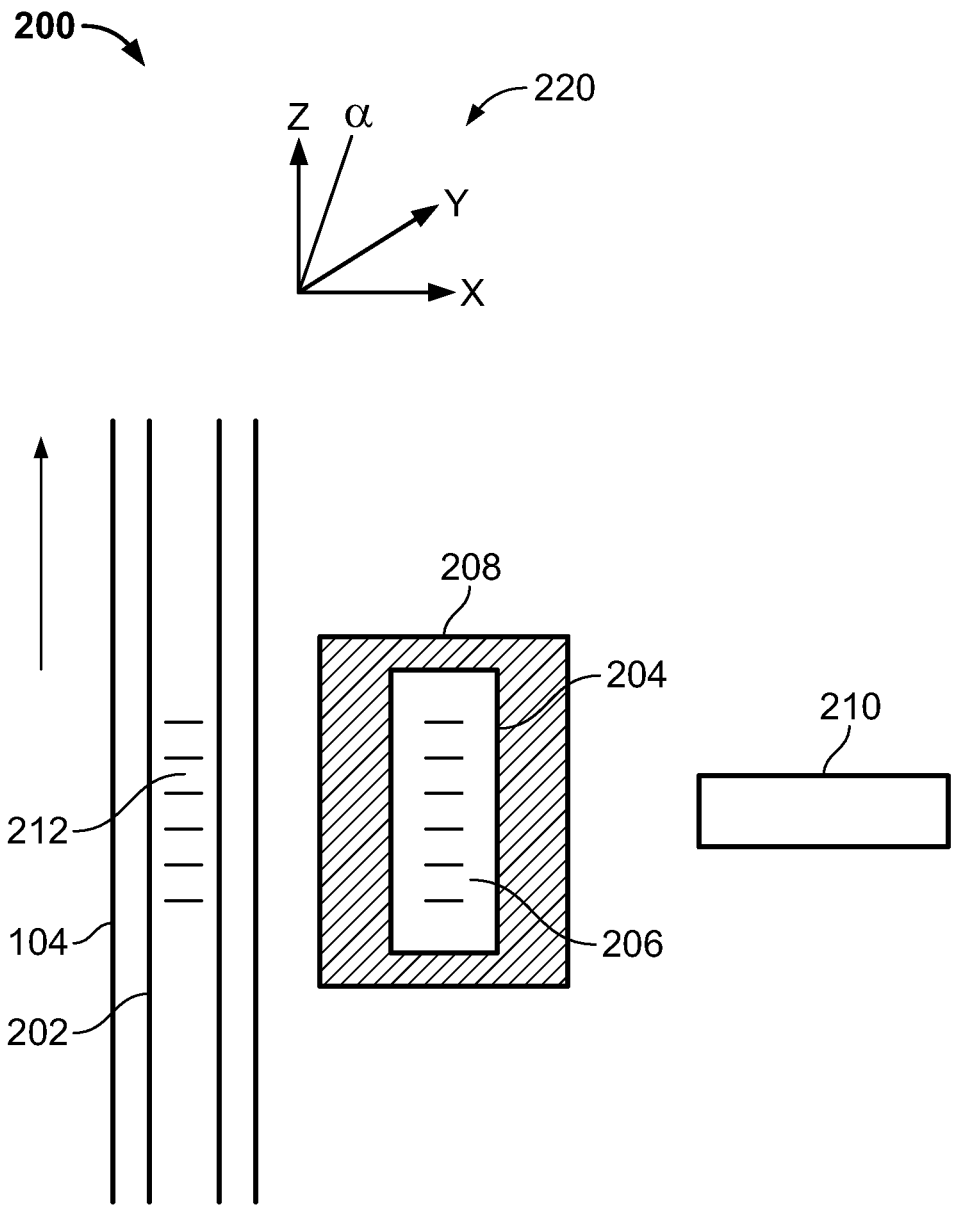
FIG. 2 shows an exemplary system or forming a fiber optic cable according to the exemplary methods disclosed herein.

FIG. 2 shows an exemplary system 200 for forming a fiber optic cable with FBGs that reduce the amount of ringing in the fiber optic cable. The system 200 includes the fiber optic cable 104 having a core 202 therein, a phase mask 204 containing a pattern 206, and a source 210 of electromagnetic radiation which is typically a light source such as a laser for transferring the pattern from the phase mask to the fiber optic cable. In the illustrative embodiment of FIG. 2, the fiber optic cable is generally aligned along a z-axis, as shown by exemplary coordinate system 220. The fiber optic cable is translated along the z-axis at a generally constant rate by a translation device such as, but not limited to, a draw tower. The pattern from the phase mask is typically transferred to the fiber optic cable by exposing the phase mask to radiation from the radiation source 210. The radiation propagates through the phase mask 204 and onto the core 202 of the fiber optic cable 104. The pattern 206 of the phase mask 204 generally is formed of opaque regions which block the radiation from reaching the fiber optic cable and transparent regions which allow light to reach the fiber optic cable. Thus, the pattern at the phase mask is transferred to the core of the fiber optic cable. The radiation is at a frequency that generally causes a change in a chemical state of the core and thus in an index of refraction of the core in order to form or "burn" the pattern into the core 202. In a typical embodiment, pattern 206 includes opaque and transparent regions alternating periodically along the z-axis. Thus, burned pattern 212 includes regions of higher and lower index of refraction alternating periodically along the z-axis, or in other words, an FBG having a central frequency. Typically, a first FBG is burned into the core of the fiber optic cable at a first location. The fiber optic cable is then translated along the z-axis a selected distance and a second FBG is burned into the core of the fiber optic cable at the second location. This process is repeated to create a plurality of FBGs in the fiber optic cable.

In various aspects of the present disclosure, a parameter relating the phase mask 204 to the fiber optic cable 104 is changed between a burning of a first FBG and a burning of a second FBG. Changing this relational parameter generally affects the grating period of the resulting FBG. In one embodiment, the parameter is a relative size of the phase mask with respect to the fiber optic cable. The size can be changed by applying a tension or a compression on either of the phase mask or the fiber optic cable. Alternatively, a temperature of either the phase mask or the fiber optic cable can be altered to cause an expansion or a contraction. The parameter can also be a relative orientation between the phase mask and the fiber optic cable. Thus, in one embodiment, the phase mask can be rotated relative to the fiber optic cable. The parameter can also be a deformation. Thus, in one embodiment, the phase mask can be deformed relative to the fiber optic cable.

The system 200 further includes an retaining unit 208 that holds the phase mask 204. Typically, the retaining unit holds the phase mask at a selected distance from the fiber optic cable during the burning process. In one aspect, the retaining unit 208 can be activated to change at least one parameter (i.e., size, orientation, shape, temperature, etc.) of the phase mask. In one embodiment, the retaining unit changes the size of the phase mask by either compressing or stretching the phase mask, typically along the z-axis. In another embodiment, the retaining unit can bend of deform the phase mask. In yet another embodiment, the retaining unit can change a temperature of the phase mask to cause the phase mask to either expand or contract. In another embodiment, the retaining unit is used to change a relative orientation between the phase mask and the fiber optic cable. In typical changes in orientation, the phase mask is rotated in the z-y plane, as shown by exemplary orientation angle α in coordinate system 220. However, rotations in other planes are also considered within the scope of the present disclosure. The parameter can be changed either by controlled process or by a random process. A controlled change can be either constant, step-wise or another relation. Alternately, the change can be periodic, such by cycling an expansion and contraction or by rocking the phase mask in the z-y plane periodically about a selected direction, such as the z-axis. Alternatively, the change in the relational parameter can be random, thereby producing dithering effects for signals travelling through the fiber optic cable. In one embodiment, a controller 220 can by coupled to the retaining unit 208 to control the various changes to the relational parameter at the phase mask. The controller, in various embodiments, can receive a signal from sensor 222 coupled to retaining unit 208 to determine the relational parameter at the phase mask. The controller can further receive a signal indicating a distance traveled by the fiber optic cable along the z-axis. The controller can also be configured to actuate the light source 210 when the fiber optic cable has traveled a selected distance.

In an alternative embodiment, the phase mask can be held constant and the parameter can be changed at the fiber optic cable. For instance, the fiber optic cable can be stretched or compressed. Also the fiber optic cable can be heated or cooled, in order to expand or contract, respectively, the fiber optic cable. Thus, the grating period of an FBG formed in the fiber optic cable can be determined by selecting a length scale or temperature of the fiber optic. In these embodiments, the controller 220 can be configured to alter the relational parameter at the fiber optic cable.

Figure 3A:
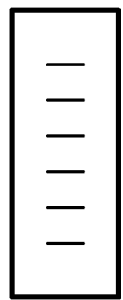
FIGS. 3A-3D illustrate various methods for changing a phase mask parameter to produce features in a fiber optic cable according to various embodiments.
Figure 3B:
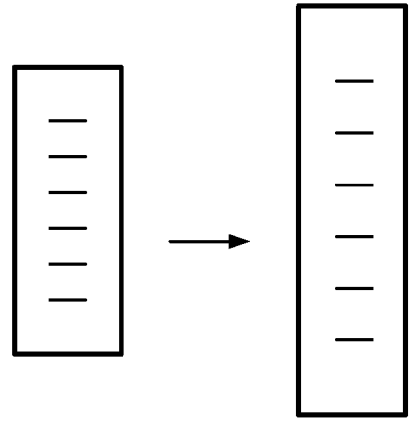
Figure 3C:
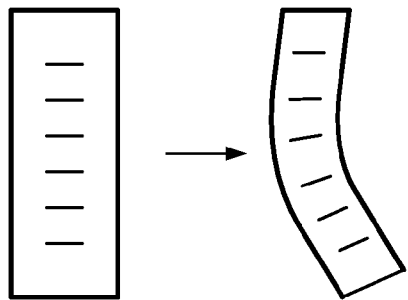
Figure 3D:
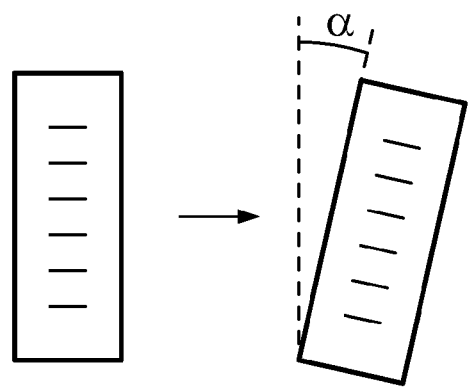

FIGS. 3A-3D illustrate various methods for changing a phase mask parameter to produce features in a fiber optic cable using the methods disclosed herein. FIG. 3A illustrates contracting the phase mask, typically by either applying a compressive force on the phase mask or by lowering a temperature of the phase mask. FIG. 3B illustrates stretching the phase mask, typically by either applying a tensile force on the phase mask or by raising a temperature of the phase mask. FIG. 3C illustrates bending or deforming the phase mask. FIG. 3D illustrates a rotation of the phase mask. In various embodiments, the angle a can be changed continuously or by periodic oscillation.

Figure 4A:
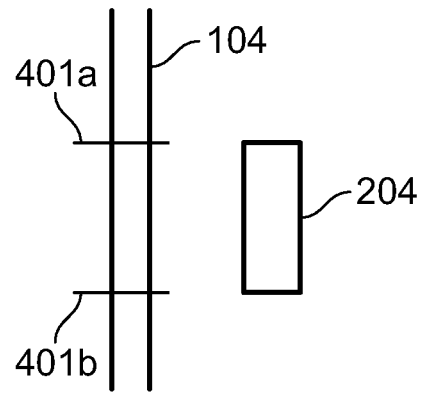
FIGS. 4A-4C illustrate an exemplary method of changing a relational parameter between a phase mask and the fiber optic cable.
Figure 4B:
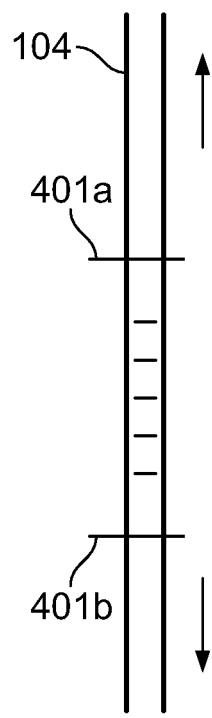
Figure 4C:
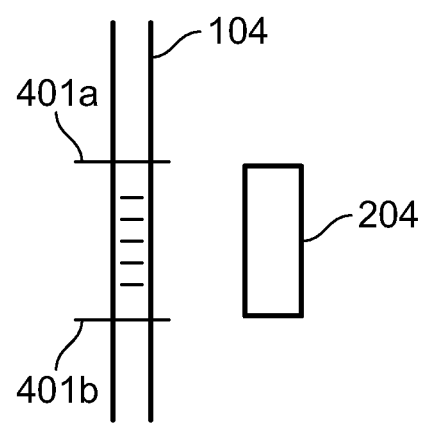

FIGS. 4A-4C illustrates an exemplary method of changing a relational parameter between the phase mask and the fiber optic cable. In FIG. 4A, the fiber optic cable 104 is in a relaxed stated with respect of the phase mask 204. Markers

401a and 401b are shown to illustrate relative sizes of the fiber optic cable 104 and phase mask 204. In FIG. 4A, the markers 401a and 401b are aligned with the top and bottom edges, respectively, of the phase mask 204. In FIG. 4B, the fiber optic cable 104 is expanded, as shown by the relative position of the markers 401a and 401b with respect to the phase mask 204. Pattern 212 is burned in the fiber optic cable while the fiber optic cable is in this expanded state. In FIG. 4C, the fiber optic cable relaxed, bringing markers 401a and 401b substantially in alignment with the edges of phase mask. The result is to shorten the pattern 212 formed in FIG. 4B, resulting in shortening the grating period and central wavelength of the resulting FBG. Therefore, a relation between a first pattern and a second pattern burned in the fiber optic cable is a result of a change in the relational parameter between the fiber optic cable and the phase mask between the burning of the first pattern and the burning of the second pattern. Although, the method illustrated in FIGS. 4A-4C is directed toward stretching the fiber optic cable, it is easy to see that this can be also applied to changing the parameter of the phase mask as well as to the other changes in parameter disclosed herein.

Figure 5A:
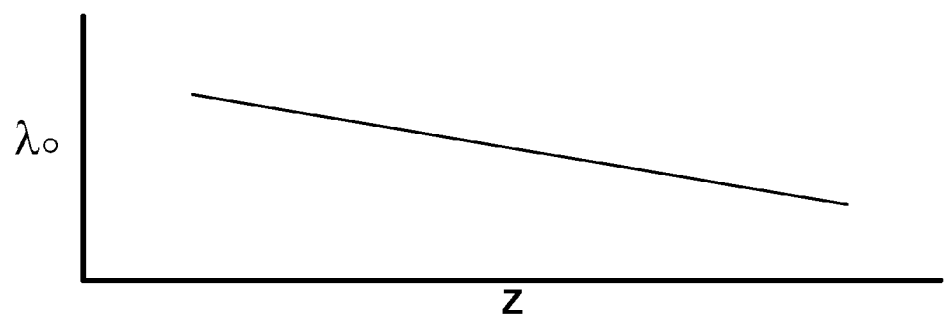
FIGS. 5A-D show various relations that can be formed between central wavelength and the fiber optic cable using the exemplary methods of the present disclosure.
Figure 5B:
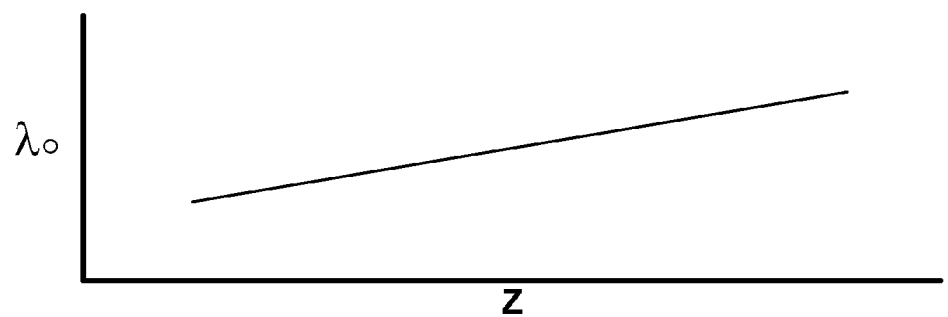
Figure 5C:
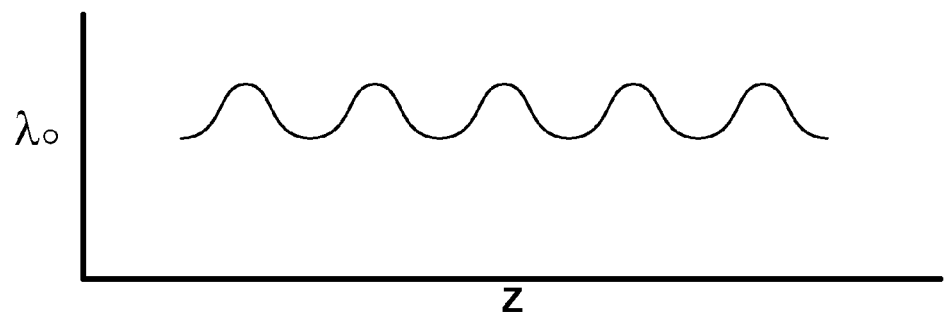
Figure 5D:
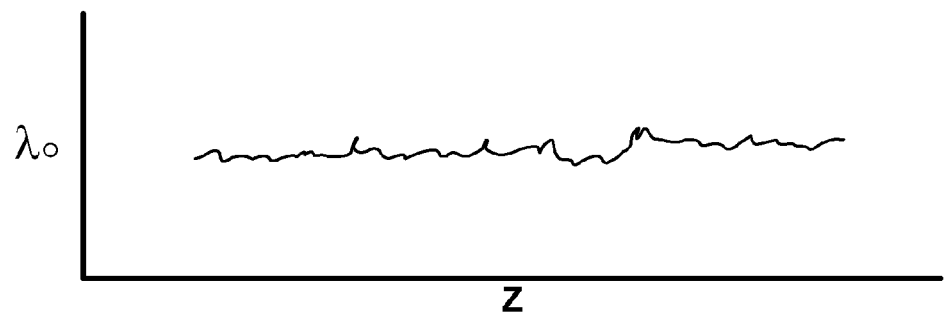

FIGS. 5A-D show various relations that can be formed between central wavelengths and the FBGs of the fiber optic cable using the methods of the present disclosure. For FIGS. 5A-5D, the sensors are formed along the abscissa (z) and central wavelength $\lambda_0$ is shown along the ordinate. FIG. 5A shows central wavelengths linearly related to location by an increase in the central wavelength with distance along the fiber optic cable. FIG. 5B shows central wavelengths linearly related to location by an decrease in the central wavelength with distance along the fiber optic cable. FIG. 5C shows a periodic variation in the central wavelength, typically formed by oscillating the phase mask or by periodic changes in size and/or temperature of the phase mask, as well as periodic changes in size and/or temperature of the fiber optic cable. FIG. 5D discloses a variation about the central wavelength that is substantially random. This can be performed by randomly changing an orientation angle a or by random changes in scale or temperature between burnings. Randomly changing central wavelengths can produce dithering effects for signals travelling in the fiber optic cable, thereby improving signal quality and reducing signal-to-noise ratio over a fiber optic cable having a plurality of sensors having substantially the same central wavelength.

Therefore, in one aspect, the present disclosure provides a method of forming a fiber optic cable, including: forming a first pattern of a phase mark at a first location in the fiber optic cable; changing a relational parameter between the fiber optic cable and the phase mask; and forming a second pattern of the phase mask at a second location in the fiber optic cable, wherein the second pattern is related to the first parameter via the relational parameter. The relational parameter can be a relative size between the phase mask and the fiber optic cable, a relative orientation between the phase mask and the fiber optic cable, a relative temperature between the phase mask and the fiber optic cable, and a relative deformation. In various embodiments, the relational parameter can be changed by performing at least one of: (i) compressing the phase mask, (ii) stretching the phase mask, (iii) bending the phase mask; (iv) changing the temperature of the mask; (v) changing an angle of rotation between the phase mask and the fiber optic cable; (vi) changing a tension of the fiber optic cable; and (vii) changing a temperature of the fiber optic cable. Typically, the at least one of the first pattern and the second pattern forms a Fiber Bragg Grating in the fiber optic cable. A central wavelength of the formed Fiber Bragg Grating is related to the relational parameter between the phase mask and the fiber optic cable during formation of the Fiber Bragg Grating. In another embodiment, the fiber optic cable is drawn in a direction substantially perpendicular to light passing through the phase mask to form the pattern. The relational parameter can be changed via a controlled variation or a random variation. In one embodiment, a third pattern is formed at a third location in the fiber optic cable, wherein a distance between the first and second locations is substantially the same as a distance between the second and third locations.

In another aspect, the present disclosure provides an apparatus for forming a fiber optic cable, including a phase mask; a source of electromagnetic radiation configured to propagate light towards the phase mask to transfer a pattern at the phase mask to the fiber optic cable; and a retaining unit configured to change a relational parameter between the phase mask and the fiber optic cable. Typically, the relational parameter between the phase mask and the fiber optic cable is one of: (i) a relative size; (ii) a relative orientation; (iii) a relative temperature; and (iv) a relative deformation. The retaining unit can change the relation by performing at least one of: (i) compressing the phase mask, (ii) stretching the phase mask, (iii) bending the phase mask; (iv) changing the temperature of the mask; (v) changing an angle of rotation between the phase mask and the fiber optic cable. The pattern generally includes a Fiber Bragg Grating pattern and a central wavelength of the Fiber Bragg Grating formed in the fiber optic cable is related to the relational parameter between the phase mask and the fiber optic cable during formation of the Fiber Bragg Grating. In another embodiment, a translation device draws the fiber optic cable. The translation device can be configured to change at least one of: (i) a tension of the fiber optic cable; and (ii) a temperature of the fiber optic cable. A controller can be used to control the device to change the relational parameter via one of: (i) a controlled variation; and (ii) a random variation. In one embodiment, the apparatus transfers the pattern to a plurality of locations that are substantially equidistantly spaced along the fiber optic cable.

In yet another aspect, the present disclosure provides a system for forming a fiber optic cable, including: a phase mask; a source of electromagnetic radiation configured to propagate light towards the phase mask to transfer a pattern at the phase mask to the fiber optic cable; a retaining unit configured to change a relational parameter between the phase mask and the fiber optic cable; and a controller configured to control the retaining unit to change the relational parameter. The relational parameter between the phase mask and the fiber optic cable can be a relative size, a relative orientation, a relative temperature, or a relative deformation. The controller can change the relational parameter via one of: (i) a controlled variation; and (ii) a random variation.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of forming a fiber optic cable, comprising:
    forming a first pattern of a phase mask at a first location in the fiber optic cable, while drawing the fiber optic cable from a draw tower;
    changing an angle of rotation between the fiber optic cable and the phase mask using a random variation of the angle of rotation; and forming a second pattern of the phase mask at a second location in the fiber optic cable while drawing the fiber optic cable from the draw tower, wherein the second pattern is related to the angle of rotation.

2. The method of claim 1, further comprising changing a relational parameter between the fiber optical cable and the phase mask, wherein the relational parameter is one of: (i) a relative size; (ii) a relative temperature; and (iii) a relative deformation.

3. The method of claim 2, further comprising changing the relational parameter by performing at least one of: (i) compressing the phase mask, (ii) stretching the phase mask, (iii) bending the phase mask; (iv) changing the temperature of the mask; (v) changing a tension of the fiber optic cable; and (vi) changing a temperature of the fiber optic cable.

4. The method of claim 1, wherein forming at least one of the first pattern and the second pattern further comprises forming a Fiber Bragg Grating in the fiber optic cable.

5. The method of claim 4, wherein a central wavelength of the Fiber Bragg Grating is related to the angle of rotation between the phase mask and the fiber optic cable during formation of the Fiber Bragg Grating.

6. The method of claim 1, further comprising drawing the fiber optic cable in a direction substantially perpendicular to light passing through the phase mask to form the pattern.

7. The method of claim 1, further comprising forming a third pattern of the phase mask at a third location in the fiber optic cable, wherein a distance between the first and second locations is substantially the same as a distance between the second and third locations.

8. An apparatus for forming a fiber optic cable, comprising:
a draw tower;
a phase mask;
a source of electromagnetic radiation configured to propagate light towards the phase mask to transfer a pattern at the phase mask to the fiber optic cable as the fiber optic cable is drawn from the draw tower; and
a retaining unit configured to randomly vary an angle of rotation between the phase mask and the fiber optic cable.

9. The apparatus of claim 8, wherein the retaining unit is further configured to change a relational parameter between the phase mask and the fiber optic cable that is one of: (i) a relative size; (ii) a relative temperature; and (iii) a relative deformation.

10. The apparatus of claim 9, wherein the retaining unit is further configured to change the relational parameter by performing at least one of: (i) compressing the phase mask, (ii) stretching the phase mask, (iii) bending the phase mask; and (iv) changing the temperature of the mask.

11. The apparatus of claim 8, wherein the pattern further comprises a Fiber Bragg Grating pattern.

12. The apparatus of claim 11, wherein a central wavelength of the Fiber Bragg Grating formed in the fiber optic cable is related to the angle of rotation between the phase mask and the fiber optic cable during formation of the Fiber Bragg Grating.

13. The apparatus of claim 8, further comprises a translation device for drawing the fiber optic cable.

14. The apparatus of claim 13, wherein the translation device is further configured to change at least one of: (i) a tension of the fiber optic cable; and (ii) a temperature of the fiber optic cable.

15. The apparatus of claim 8, wherein the apparatus is configured to transfer the pattern to a plurality of locations that are substantially equidistantly spaced along the fiber optic cable.

16. A system for forming a fiber optic cable, comprising:
a phase mask;
a draw tower;
a source of electromagnetic radiation configured to propagate light towards the phase mask to transfer a pattern at the phase mask to the fiber optic cable as the fiber optic cable is being drawn from the draw tower;
a retaining unit configured to change an angle of rotation between the phase mask and the fiber optic cable; and
a controller configured to control the retaining unit to randomly vary the angle of rotation.

17. The system of claim 16, wherein the retaining unit is further configured to change a relational parameter between the phase mask and the fiber optic cable that is one of: (i) a relative size; (ii) a relative temperature; and (iii) a relative deformation.

* * * * *